United States Patent [19]

Schilling et al.

[11] Patent Number: 5,456,346
[45] Date of Patent: Oct. 10, 1995

[54] CONTINUOUS CONVEYOR FOR TRANSPORTING INDIVIDUAL HANGERS

[75] Inventors: Gerhard Schilling; Ralf Schneuing; Paul Janzen, all of Bielefeld, Germany

[73] Assignee: Durkopp Adler Aktiengesellschaft, Germany

[21] Appl. No.: 255,164

[22] Filed: Jun. 7, 1994

[30] Foreign Application Priority Data

Jun. 9, 1993 [DE] Germany ............ 43 19 164.9

[51] Int. Cl.⁶ .................................................. B65G 17/32
[52] U.S. Cl. ................... 198/685; 198/465.4; 198/678.1
[58] Field of Search ................... 198/678.1, 680, 198/684, 685, 465.4, 725, 728, 729

[56] References Cited

U.S. PATENT DOCUMENTS

| | | | |
|---|---|---|---|
| 2,146,689 | 2/1939 | Simon | 198/685 |
| 3,403,767 | 10/1968 | Gerisch | 198/465.4 X |

FOREIGN PATENT DOCUMENTS

| | | | |
|---|---|---|---|
| 0362936 | 4/1990 | European Pat. Off. | |
| 7011838 | 4/1970 | Germany. | |
| 2121087 | 12/1971 | Germany. | |
| 2263330 | 7/1973 | Germany. | |
| 2506587 | 9/1975 | Germany. | |
| 2606738 | 9/1976 | Germany. | |
| 3336190 | 5/1985 | Germany. | |
| 8809769 | 11/1988 | Germany. | |
| 3807280 | 5/1989 | Germany. | |
| 9001627 | 6/1990 | Germany. | |
| 3909002 | 7/1990 | Germany | 198/465.4 |
| 9003620 | 9/1990 | Germany. | |
| 3929158 | 3/1991 | Germany. | |
| 3929156 | 4/1991 | Germany. | |
| 9002594 | 8/1991 | Germany. | |
| 9210120 | 1/1994 | Germany. | |

Primary Examiner—James R. Bidwell
Attorney, Agent, or Firm—Ostrolenk, Faber, Gerb & Soffen

[57] ABSTRACT

A continuous conveyor for transporting individual clothes hangers, the conveyor being inclined by an angle with respect to a horizontal axis which is perpendicular to the transport direction, and having a driven circulating chain. The chain has triangular pushers projecting from the chain and serving to transport the hanger hooks. The chain is guided in a bipartite frame which engages and defines the entire run of the chain. Such a design makes possible a limited structural height so that even hangers that have only a short hook can be conveyed.

20 Claims, 3 Drawing Sheets

CONTINUOUS CONVEYOR FOR TRANSPORTING INDIVIDUAL HANGERS

BACKGROUND OF THE INVENTION

1. Field of the Invention

The invention relates to a conveyor, and more particularly to a continuous conveyor with a driven chain for transporting individual hangers by their hooks.

2. Discussion of the Related Art

Various types of conveyors are known for conveying articles of clothing hanging on clothes hangers. For example, the hanger hooks can be suspended from a rotatably mounted feed screw, and a transport movement in the horizontal direction can be conferred on them by the rotation of the feed screw (DE-OS 25 06 587). Automatic loading of the hanger hooks onto such a spindle conveyor is not reproducible because it is not possible to predict which turn of the feed screw will engage and transport the hanger hooks.

German Patent 22 63 330 teaches providing a vertically circulating chain with lateral pushers to transport articles of clothing hanging on hangers in the vertical direction, the hooks of the clothes hangers being suspended on the pushers. In this fashion, for example, transportation over several stories of a building is possible.

German Patent 38 07 280 and U.S. Pat. No. 4,903,819 disclose an unloading device for support hanger conveyor carriages in which the hanger hooks are pushed individually along a sliding rod by a circulating conveyor provided with pushers, located above the hanger hooks. The pusher on the conveyor engages the hanger hooks from above. The hanger hook is guided by the sliding rod supporting it.

DE-GM 70 11 838 discloses a roller chain with collateral transporting clamps (5). The transporting clamps bear upwardly projected transporting jaws (7), which are pivotally mounted. This type of transporting chain is used with packaging machines, for example for transporting small boxes. The pivotability of the jaws (7) enables the chain to be adjusted to transport boxes of different sizes. In this arrangement, the jaws will not be pivotable unless the chain is horizontal.

Also of background interest is DE-GM 92 10 120, which was registered in Germany as a GM on Dec. 12, 1993, after the priority date of the present application.

Other patent documents of interest are DE-GM 88 09 769, DE-OS 33 36 190, DE-GM 90 02 594, DE-OS 39 29 158, DE-OS 21 21 087, DE-OS 26 06 738, DE-OS 39 29 156, DE-GM 90 01 627, DE-GM 90 03 620, and EP 0 362 936-A1.

SUMMARY OF THE INVENTION

An important goal of the invention is to provide a conveyor, especially a continuous conveyor, for individual hangers, which is simple in design, ensures a space-saving arrangement, and ensures safe guidance of the clothes hangers and/or clothes hanger hooks.

This and other goals may be accomplished by a continuous conveyor, for transporting articles of clothing hanging on hangers provided with hooks, comprising a circulating driven chain; a frame which guides the chain inclined by an acute angle with respect to a horizontal; individual chain links of the chain having pushers projecting from the chain for engaging and pushing the hangers.

The tilted position of the chain of the conveyor causes the latter to travel parallel to the angled portion of a clothes hanger hook, so that contact of the conveyor with the clothing hanging on the hanger can be reliably avoided even when the hanger hook is made very short.

The pushers may have a predetermined spacing which defines the tolerances of the conveyor, making the latter especially suitable as a transfer conveyor from one conveyor circuit to another.

The front edge of each pusher may be substantially perpendicular to the transport direction. The pushers may be substantially triangular.

The pushers may further be mounted offset from a lengthwise axis of the chain. The eccentric arrangement of the pushers on the chain causes the hangers to arrange themselves transversely during transport, at a desirable angle to the transport direction, resulting in considerably improved guidance.

The chain is advantageously guided in a frame divided crosswise by a dividing gap, to define front and rear frame halves, relative to the transport direction, the halves having recesses opposite one another and jointly accepting a compression spring for urging the frame halves away from each other. The frame may also have a pair of legs running parallel to the chain and extending from the frame for guiding the hanger hook, the heights of the legs with respect to the chain being determined for engaging and guiding the hanger hook with the hanger being substantially horizontal. The legs may be sloped downward at a front end of the frame with respect to the transport direction.

The bevel on the frame connection with the arcuate transport path of the hanger hook on the chain at this point, produces a narrowing slot through which the hanger hook comes off the conveyor with pressure behind it.

It is highly advantageous for the chain to directly engage and be guided by the frame over substantially its entire run. The fact that the chain is guided and deflected by the frame itself makes it possible to lower the diameter of the deflection below the minimum diameter that would be required if chainwheels were used. This reduces the structural height to the point where the conveyor can be located nearly within the space defined by the hanger hooks themselves.

In other words, the minimum number of teeth on a sprocket wheel for guiding the chain would usually be considered to be about eleven, with conventional components, since the contact between the chain and the sprocket wheel usually becomes poor if the number of teeth is less than about eleven. On the other hand, the "virtual" number of teeth calculated on the basis of the distance between the upper and lower runs of the chain is about eight. Thus, the use of the frame itself to guide and deflect the chain reduces the required height by about (11-8)/11, or 27.3 percent.

Above an upper run of the chain, there may be provided a protective strip running horizontally and extending in the transport direction over a majority of the length of the upper run. The protective strip preferably extends over substantially the entire length of the upper run, and is desirably displaceable in substantially the vertical direction against the force of at least one spring.

Other features and advantages of the present invention will become apparent from the following description of the invention which refers to the accompanying drawings.

DETAILED DESCRIPTION OF AN EMBODIMENT OF THE INVENTION

Figure 1:
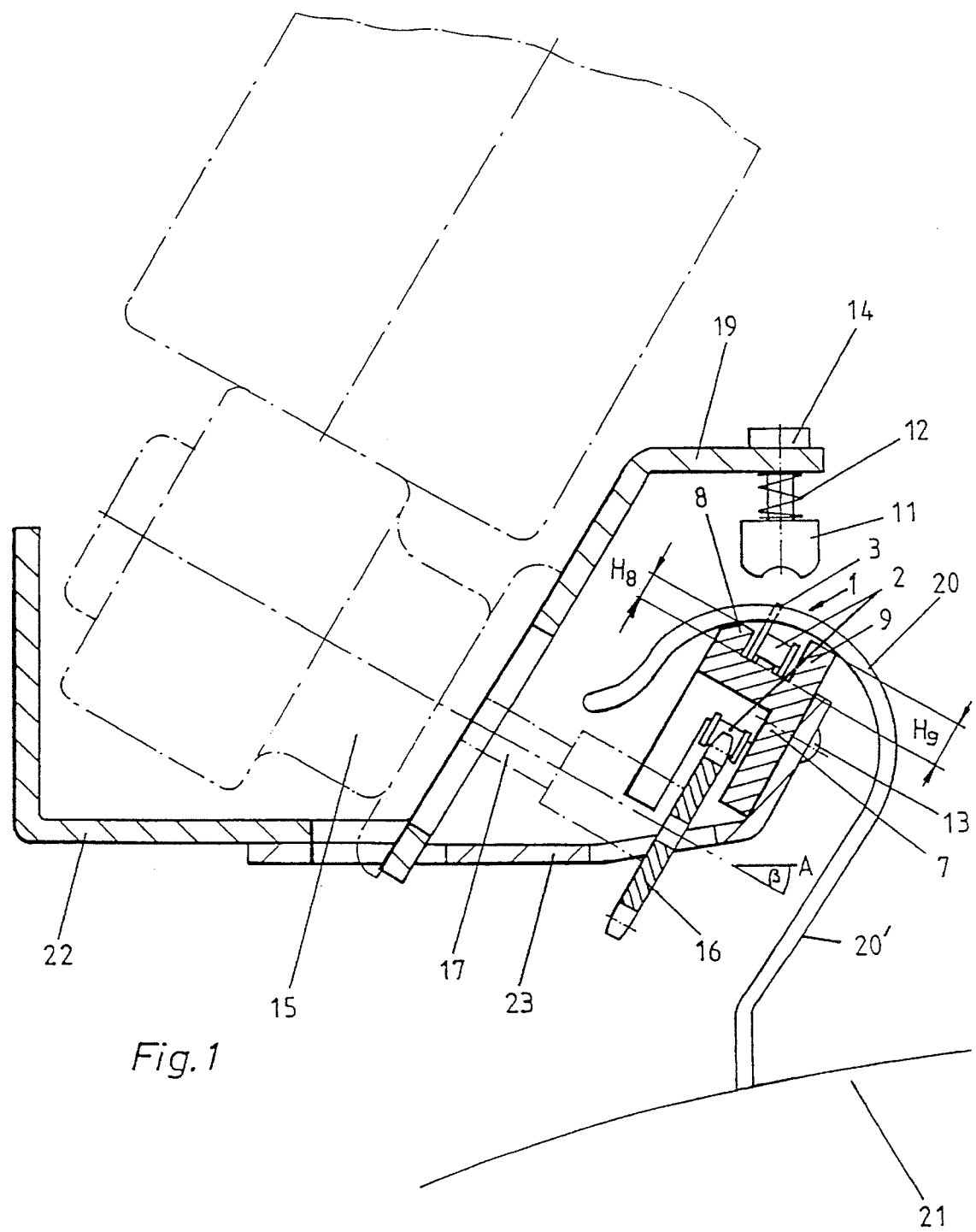
FIG. 1 shows a cross-sectional view of the conveyor, perpendicular to the transport direction.

The conveyor comprises a frame 7 that guides a chain 1, having two frame halves 7a and 7b. See FIG. 2. Chain 1 is a conventional roller chain. Individual chain links 2 have pushers 3 that project above chain 1 perpendicularly with respect to transport direction T. These pushers 3 have a triangular form and their front edges 3' which serve to contact the hanger hooks 20 are perpendicular to transport direction T. Transport direction T is defined by the circulation direction of chain 1.

Chain 1 is driven by a drive motor 15 (FIG. 1) acting through a drive shaft 17 on drive pinion 16, said pinion being arranged in the frame half 7b (at the right in FIG. 2) in such fashion that the lower run 1" of chain 1 is guided over it. Frame 7 has a circumferential cut extending in its lengthwise direction in which chain 1 is guided. Chain 1 is likewise deflected at the ends of the frame 7 directly by the cut provided in frame 7.

Frame 7 is divided into a front and a rear frame half 7a and 7b by a dividing gap 10 generally perpendicular or transverse to its lengthwise direction.

Figure 2:
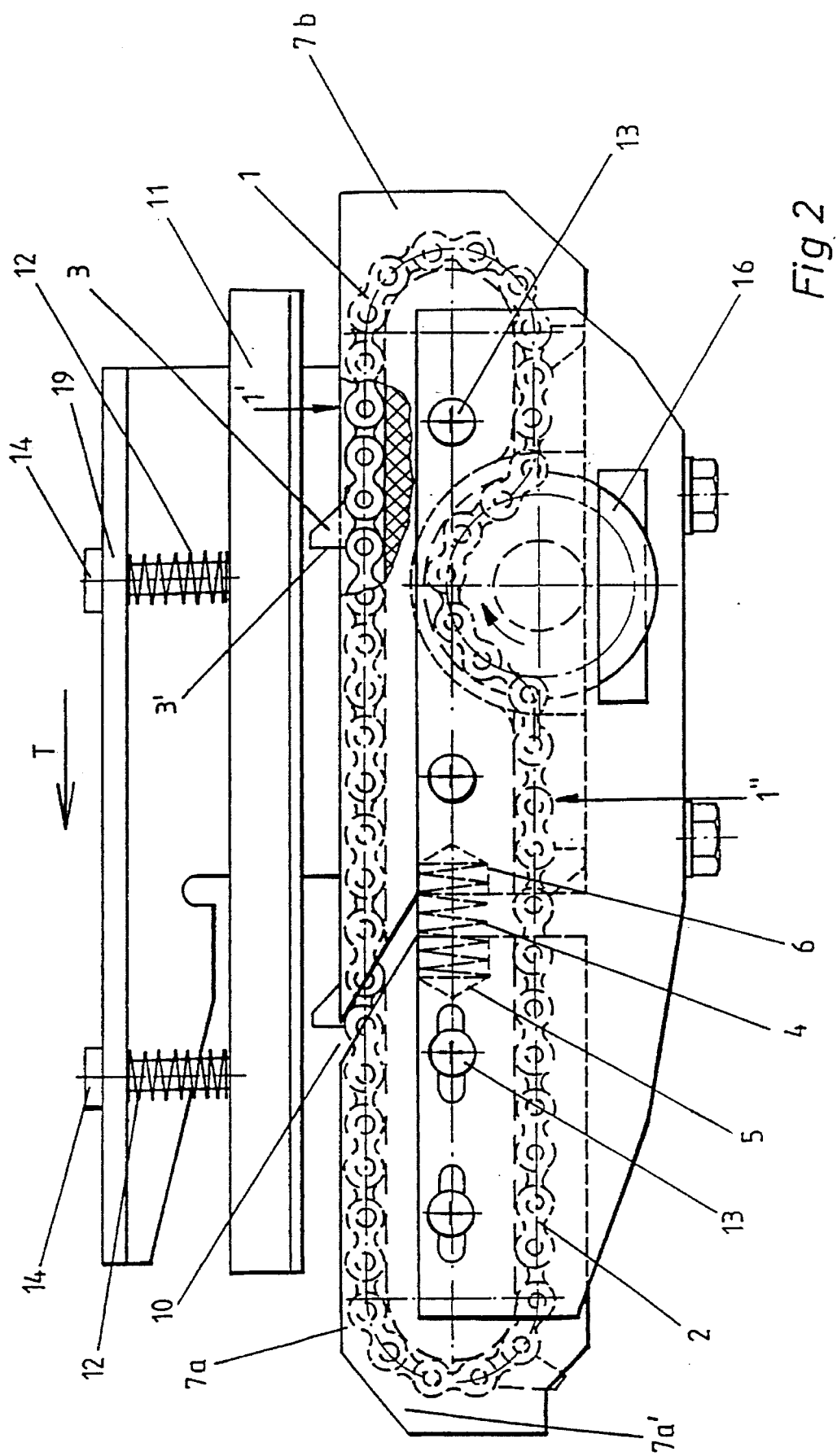
FIG. 2 is a side view of the conveyor, partially in cross-section.

FIG. 2 shows that each of the two frame halves 7a and 7b has a recess 5, 6 at its inner end which, as shown here, is formed by a blind hole. These two recesses 5 and 6 are opposite one another when the frame 7 is in the assembled state and bear a compression spring 4 whose two ends each abut one half of the frame. This compression spring 4 forces the two frame halves 7a and 7b apart along suitable guides, not shown here in greater detail. This produces an absolute tension on chain 1 which consequently is always driven without play.

Pushers 3 are distributed at regular intervals on chain links 2 of chain 1. This provides a defined distance between the hangers 21 to be transported and a synchronization of the hangers 21, which is useful when, for example, transfer is to take place to another conveyor, such as the pockets of a high-speed conveyor in which only one conveyor pocket is provided for each hanger.

Figure 3:
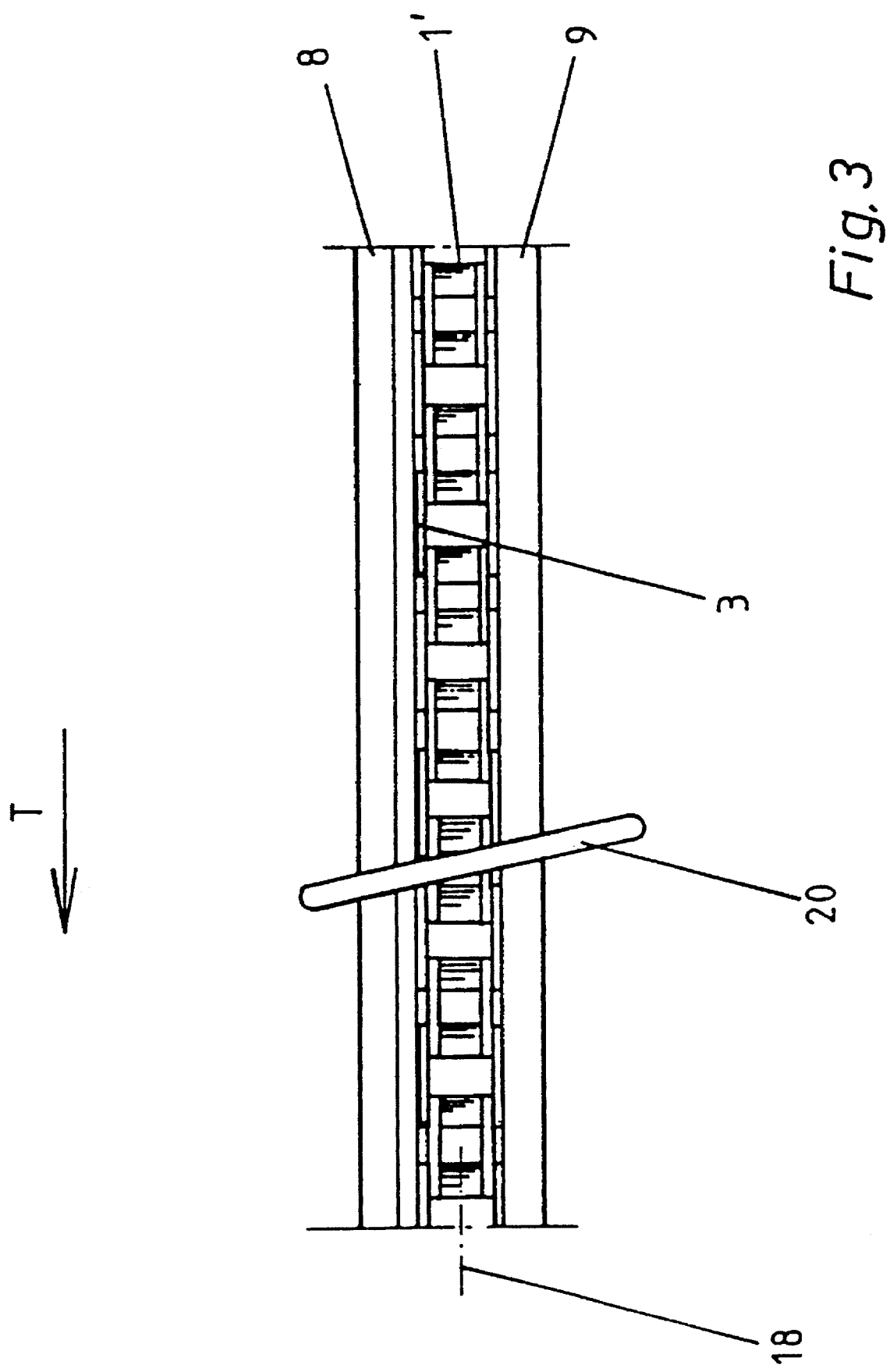
FIG. 3 is a partial top view of the conveyor.

The triangular pushers 3 are arranged offset relative to the lengthwise axis 18 of conveyor chain 1 in the direction of drive motor 15, as shown in FIG. 3. This means that the transporting force acting on hanger hooks 20 does not engage centrally of the hanger hooks and thereby sets hanger hooks 20 at an acute angle with respect to the chain 1 during transport, as shown in FIG. 3, which ensures improved transport stability.

As FIG. 1 shows, chain 1 is provided at an angle β to the horizontal A which is perpendicular to transport direction T. Slope angle β is advantageously chosen in such fashion that the conveyor, i.e. in particular drive pinion 16 and chain 1, is parallel to the bevel 20' of hook 20. It is advantageously 15–45 degrees. It is advantageous for the angles of incline of the chain 1 and the bevel 20' to be as close as possible. This arrangement leaves a maximum distance between drive pinion 16 and hanger 21 so that hanger hooks with a limited height can also be transported without problems, even when the hangers are swinging.

On its upper side, frame 7 has legs 8 and 9 surrounding the circumferential cut which run parallel to chain 1 on both sides. Legs 8 and 9 serve to support and guide hook 20. Height $H_9$ of leg 9, which is closer to the interior of hook 20, is greater than height $H_8$ of leg 8 which is closer to the tip of hook 20. The difference between heights $H_8$ and $H_9$ is chosen so that hanger 21 and/or hook 20 is guided in a horizontal plane despite the tilted position of the conveyor. End portions of the legs 8 and 9 (such as the inner edge of the leg 8 as shown in FIG. 1) may be bevelled or curved to match the curvature of the hook 20.

The conveyor is mounted on metal brackets 22, 23 bent at an angle and integrated, in a manner not shown here in greater detail, into a conveyor system, for example the main conveyor line of the conveyor system. The attachment of frame 7 to bracket 23 is accomplished with several bolts 13. To adjust the chain tension, the front frame half 7a is arranged in elongated holes made in bracket 23, not shown here in greater detail.

A protective strip 11 is mounted below a protective panel 19 that runs between the conveyor and drive motor 5. The protective strip 11 is mounted on protective panel 19 by several bolts 14 and compression springs 12 abutting the interior of protective strip 11 and protective panel 19, to be movable in the vertical direction. Protective strip 11 prevents injury to operating or maintenance personnel when the conveyor is running. The vertical mobility of protective strip 11 ensures that a hanger hook can be removed in simple fashion from the conveyor or, if necessary, inserted onto on the conveyor.

Frame 7 is preferably made of plastic that exhibits self-lubricating properties with respect to chain 1. A thin film of lubricant is required only once so contamination of the articles of clothing being transported is effectively avoided and emergency running properties are improved.

Although the present invention has been described in relation to particular embodiments thereof, many other variations and modifications and other uses will become apparent to those skilled in the art. It is preferred, therefore, that the present invention be limited not by the specific disclosure herein, but only by the appended claims.

What is claimed is:

1. A continuous conveyor, for transporting articles of clothing hanging on hangers provided with hooks, comprising:

a circulating driven chain having a direction of transport and directly supporting the hanger hooks on an upper surface of the chain, individual chain links of the chain having pushers projecting from the upper surface of the chain for engaging and pushing the hangers; and a frame which guides the chain inclined by an acute angle with respect to a horizontal which is perpendicular to the direction of transport.

2. A conveyor according to claim 1, wherein a front edge with respect to the transport direction of each pusher is substantially perpendicular to the transport direction.

3. A conveyor according to claim 2, wherein the pushers are substantially triangular.

4. A conveyor according to claim 2, wherein the pushers are mounted offset laterally from a lengthwise axis of the chain.

5. A conveyor according to claim 1, wherein the pushers are mounted offset laterally from lengthwise axis of the chain.

6. A conveyor according to claim 1, wherein the frame is divided crosswise by a dividing gap, to define front and rear frame halves relative to the transport direction, the halves having recesses opposite one another and jointly accepting a compression spring for urging the frame halves away from each other.

7. A conveyor according to claim 1, wherein the frame has a pair of legs running parallel to the chain and extending from the frame for guiding the hanger hook, the heights of the legs with respect to the chain being determined for engaging and guiding the hanger hook with the hanger being substantially horizontal.

8. A conveyor according to claim 7, wherein the legs are sloped downward at a front end of the frame with respect to the transport direction.

9. A conveyor according to claim 1, further comprising, above an upper run of the chain, a protective strip running horizontally and extending in the transport direction over a majority of the length of the upper run.

10. A conveyor according to claim 9, wherein said protective strip extends over substantially the entire length of the upper run.

11. A conveyor according to claim 9, wherein the protective strip is displaceable in substantially the vertical direction against the force of at least one spring.

12. A conveyor according to claim 1, wherein the chain directly engages and is guided by the frame over substantially its entire run.

13. A conveyor according to claim 1, in combination with a hanger hook having a carrying portion and having a shank portion which defines an angle with respect to the horizontal, wherein the angle of incline of the chain is substantially the same as the angle of the shank portion of the hanger hook.

14. A conveyor according to claim 13, wherein the carrying portion of the hanger hook defines a curve having a chord which is generally perpendicular to the shank portion, and the frame engages a middle portion of the carrying portion of the hanger hook.

15. A conveyor according to claim 1, wherein said acute angle of incline of the chain is substantially 15–45 degrees.

16. A conveyor according to claim 1, wherein the frame is divided laterally into two frame halves, the conveyor further comprising spring means for urging the frame halves away from each other to produce a tension on the chain such that the chain is driven without play.

17. A conveyor according to claim 1, wherein the frame has a circumferential cut extending around the frame in a lengthwise direction in which the chain is guided.

18. A conveyor according to claim 1, wherein the chain directly engages and is guided by the frame over substantially an entire length of the chain.

19. A continuous conveyor, for transporting articles of clothing hanging on hangers provided with hooks, the conveyor comprising:

a circulating driven chain having a direction of transport, individual chain links of the chain having pushers projecting from the chain for engaging and pushing the hangers; and a frame which guides the chain inclined by an acute angle with respect to a horizontal, the frame being divided crosswise by a dividing gap, to define front and rear frame halves relative to the transport direction, the halves having recesses opposite one another and jointly accepting a compression spring for urging the frame halves away from each other.

20. A continuous conveyor, for transporting articles of clothing hanging on hangers provided with hooks, the conveyor comprising:

a circulating driven chain having a direction of transport, individual chain links of the chain having pushers projecting from the chain for engaging and pushing the hangers;

a frame which guides the chain inclined by an acute angle with respect to a horizontal;

a protective strip running horizontally above an upper run of the chain, and extending in the transport direction over a substantially the entire length of the upper run, the protective strip being displaceable in substantially the vertical direction against a force of at least one spring.

* * * * *